United States Patent [19]
Bendicks et al.

[11] Patent Number: 5,227,705
[45] Date of Patent: Jul. 13, 1993

[54] DEVICE FOR CONTROLLING A WINDSCREEN WIPING SYSTEM

[75] Inventors: Norbert Bendicks, Hemer; Jürgen Levers, Bochum, both of Fed. Rep. of Germany

[73] Assignee: Leopold Kostal GmbH & Co. KG, Ludenscheid, Fed. Rep. of Germany

[21] Appl. No.: 899,768

[22] Filed: Jun. 17, 1992

[30] Foreign Application Priority Data

Jun. 24, 1991 [DE] Fed. Rep. of Germany ....... 4120750

[51] Int. Cl.$^5$ .............................................. B60S 1/08
[52] U.S. Cl. ................................ 318/444; 318/483; 318/DIG. 2
[58] Field of Search ......... 318/434, 444, 483, DIG. 2; 15/250 R, 250.12, 250.17

[56] References Cited

U.S. PATENT DOCUMENTS

| | | | |
|---|---|---|---|
| 3,947,131 | 3/1976 | Karl | 356/209 |
| 4,481,450 | 11/1984 | Watanabe et al. | 318/444 |
| 4,588,935 | 5/1986 | Kaneiwa et al. | 318/483 |
| 4,595,866 | 6/1986 | Fukatsu et al. | 318/444 |
| 4,636,643 | 1/1987 | Nakamura et al. | 350/341 |
| 4,798,956 | 1/1989 | Hochstein | 250/338 |
| 5,015,931 | 5/1991 | Muller | 318/483 |

FOREIGN PATENT DOCUMENTS 3314770 2/1990 Fed. Rep. of Germany.

*Primary Examiner*—Bentsu Ro
*Attorney, Agent, or Firm*—Brooks & Kushman

[57] ABSTRACT

A device is provided for controlling a windscreen wiping system, which mainly comprises a control stage, a clock generator unit comprising a switch and a clock-pulse generator, an I/V converter, a phase-selective rectifier and an amplifier with a low-pass filter as well as an optoelectronic apparatus having a plurality of beam transmitters, a beam guide element and a plurality of beam receivers. Such a device is intended to solve the technical problem of effecting automatic adjustment of the control system even under very widely varying measuring conditions determined in particular by the various damping factors of different types of windscreen. This is achieved in that the circuit arrangement of the windscreen wiping system has a control stage provided with a basic setting value, which is substantially determined by the optoelectronic apparatus when the screen is optimally clean and represents the quasi static conditions of the components provided for detecting the coating present on the screen, and in that the basic setting value is stored in a non-volatile memory of the circuit arrangement and is used as the starting value for all subsequent startups of the windscreen wiping system.

9 Claims, 1 Drawing Sheet

DEVICE FOR CONTROLLING A WINDSCREEN WIPING SYSTEM

TECHNICAL FIELD

The present invention relates to a device for controlling a windscreen wiping system.

BACKGROUND ART

The particular purpose of such devices is to detect the quality and quantity of a liquid or solid coating present on the front or rear windscreen of a motor vehicle and, in dependence thereon, automatically to influence a windscreen wiping system associated with the screen, i.e. to set said system into intermittent or continuous operation for the purpose of cleaning the screen.

A device for controlling a windscreen wiper motor has become known from DE 33 14 770 C2, which comprises an optoelectronic apparatus and a circuit arrangement having an I/V converter, a phase-selective rectifier and a low-pass filter. Said device is however so constructed that the beam intensity of the beam transmitter(s) of the optoelectronic apparatus is held constant and the conversion factor of the I/V converter is fixed. Thus, the circuit arrangement may indeed to some extent be satisfactorily automatically adapted to changing measuring conditions during wiper operation, such as, for example, dirt, rain or snow on the windscreens or response to temperature changes by the optoelectronic apparatus, in such a way that the drive motor receives meaningful control signals from the circuit arrangement, but only because said measuring conditions vary within a relatively narrow range. If, however, wide-ranging changes in measuring conditions occur, such as, for example, when different types of windscreen are in use, automatic production of meaningful control signals by the circuit arrangement is no longer possible, which ultimately results in the windscreen wiping system no longer functioning automatically in a satisfactory manner.

SUMMARY OF THE INVENTION

The object of the present invention is therefore to provide a device for controlling a windscreen wiping system which automatically adjusts even to extremely varying measuring conditions, in particular to the varying damping factors of different screen types.

Said object is achieved according to the invention by the features indicated in the defining part of the main claim. Thus, a device is provided for controlling a windscreen wiping system comprising a drive motor for at least one windscreen wiper arm for cleaning the outer surface of a screen and an optoelectronic apparatus disposed in the wiped area on the inner surface of the screen and including at least one beam transmitter and at least one beam receiver. The device also comprises a circuit arrangement connected to the optoelectronic apparatus and the drive motor, with the beams which are emitted from the at least one beam transmitter in clocked form being modified between the beam transmitter and the beam receiver by a coating on the screen so that the signals received by the beam receiver are varied in dependence upon the coating present on the screen and said signals being converted by the circuit arrangement into control signals by means of which operation of the drive motor is determined. In the preferred embodiment, the circuit arrangement includes at least one I/V converter which amplifies the alternating component of the received signal, a phase-selective rectifier which acts as a narrow-band filter and rectifies the clocked component of the output signal of the I/V converter, and low-pass filters which filter out the interference quantities of the circuit components. Preferably, the circuit arrangement of the windscreen wiping system comprises a control stage provided with a basic setting value, which is substantially determined by the optoelectronic apparatus when the screen is optimally clean and represents the quasi-static conditions of the components provided for detecting the coating present on the screen, and the basic setting value is stored in a nonvolatile memory of the circuit arrangement and is used as a starting value for all subsequent startups of the windscreen wiping system. In such a development of a device for controlling a windscreen wiping system, it is advantageous that the device may be associated with the screens of motor vehicles without any manual setting effort. Thus, for the first time, the preconditions for series application in motor vehicles are created because, there, such devices will be used in large quantities.

Further advantageous developments of the device according to the invention are indicated in the subclaims and are described in greater detail with reference to an embodiment, which is illustrated in a block diagram.

BEST MODE FOR CARRYING OUT THE INVENTION

Figure 1:
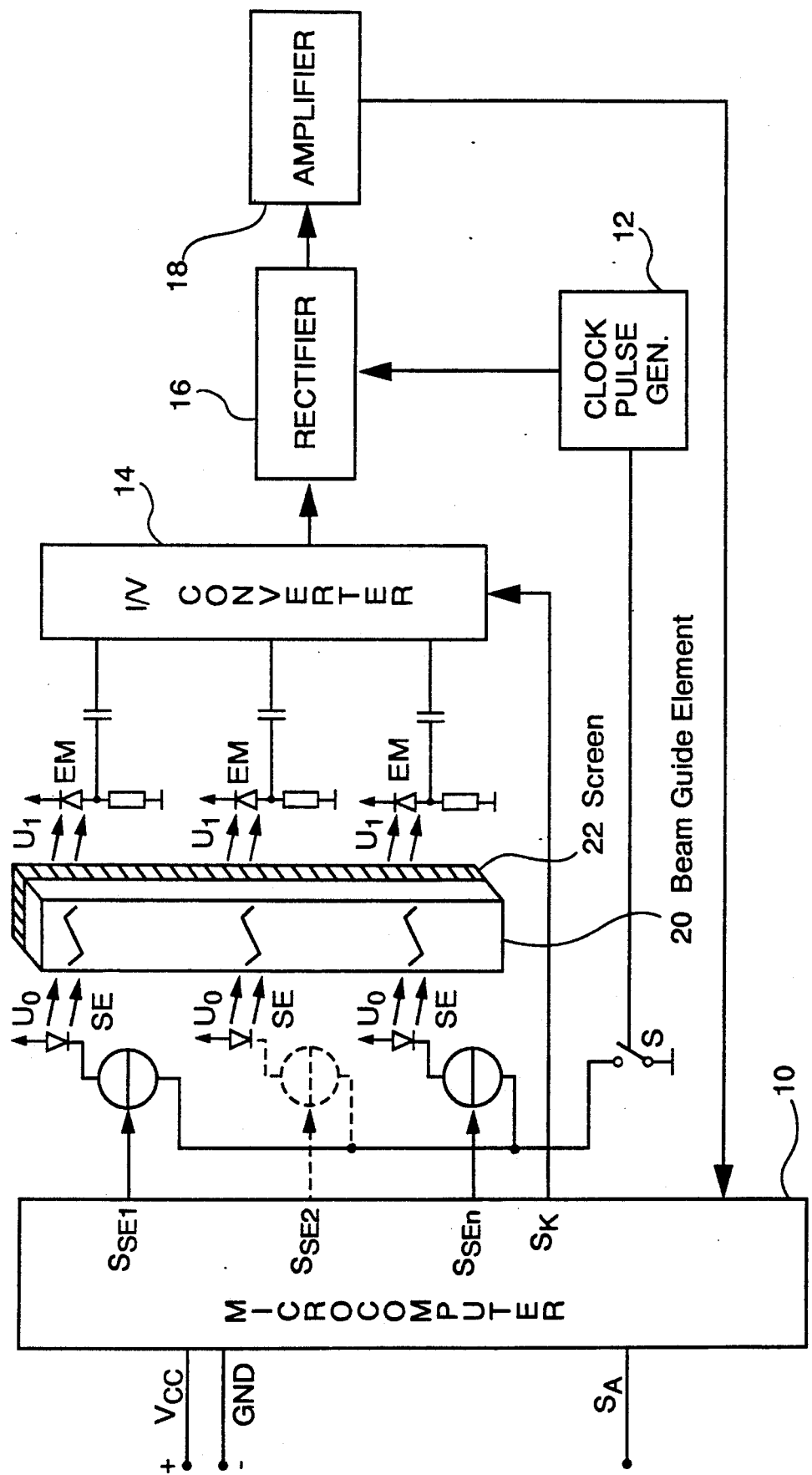
FIG. 1 is a block diagram of the device for controlling a windscreen wiping system of the present invention.

Referring now to FIG. 1, such a device for controlling a windscreen wiping system mainly comprises a control stage 10, a clock generator unit comprising a switch S and a clock-pulse generator 12, an I/V converter 14, a phase-selective rectifier 16 and an amplifier 18 with a low-pass filter as well as an optoelectronic apparatus having a plurality of beam transmitters SE, a beam guide element 20 and a plurality of beam receivers EM. A respective beam receiver EM on the output side is preferably associated with each beam transmitter SE on the input side.

The control stage 10 of the circuit arrangement is connected on the one hand via its inputs Vcc and GND to the power supply and on the other hand via its control output SA to the windscreen wiping system of a motor vehicle. Moreover, the transmitting current of the beam transmitters SE is set via the control outputs $S_{SE1}$ to $S_{SEn}$ of control stage 10 and the conversion factor of the I/V converter 14 is set via the control output SK.

The light emerging at the exit point of the optical section comprises a useful component originating from the beam transmitters SE and an interference component arising from input of parasitic light sources (ambient light). The light emitted by the beam transmitters SE in the form of IR-LEDs is converted by beam receivers EM, in the form of IR-photodiodes and connected to a voltage source $U_1$, and an associated resistor into an electrical quantity which is then likewise composed of the useful component and the interference component. The electrical quantity thus produced is additionally dependent upon the ambient temperature since the efficiency of both the IR-LEDs and the IR-photodiodes is temperature-dependent. This leads to corruption of the measuring result. To compensate said temperature effect, the transmitting current of the IR-LEDs is re-adjusted in dependence upon the temperature by the control stage 10 in such a way that the output quantity is independent of the ambient temperature.

The electrical quantity thus conditioned is supplied to the downstream circuit elements which are needed to separate the useful component from the interference component of the signal and hence keep the signal-to-noise ratio as high as possible.

The alternating component of the electrical quantity is converted into a voltage by the I/V converter 14 dynamically coupled to the receiver stage. The conversion factor may be externally preselected, i.e. set, via the control output SK. Said I/V converter stage to a large extent suppresses components of static parasitic light sources.

Further processing of the signal, now in the form of a voltage, is effected by the phase-selective rectifier 16 which operates in synchronism with the clocking, generated by the switch S and clock-pulse generator 12, of the beam transmitters SE in the form of IR-LEDs. Thus, besides the rectifying function, glitch signals of a different frequency to the clocking are suppressed.

The last stage of signal conditioning is formed by an amplifier 18 with a low-pass characteristic. The low pass smooths signal changes caused by rapid changes in ambient light.

The output signal of said amplifier stage, which acts, i.e. is correspondingly designed, as a lowpass filter, is ultimately the measure of the degree of wetting of the screen 22. Said signal is read into a microprocessor forming part of the circuit arrangement and is used to control the windscreen wiper of a motor vehicle, with the optoelectronic apparatus being associated with the wiped area of the windscreen wiper.

The microprocessor is also responsible for controlling the transmitting current of the beam transmitters SE in the form of IR-LEDs and the conversion factor of the I/V converter 14 so that the device automatically adapts to widely differing measuring conditions caused by various screen types. Said adaptation is absolutely essential because the damping factor of the entire optical section is very strongly dependent upon the screen type in question (clear glass, heat insulating glass without band-stop filter, heat insulating glass with band-stop filter). As a result of said adaptation process, the circuit arrangement of the device is automatically switched into its optimum operating range. The setting values thereby acquired are stored in a non-volatile memory of the circuit arrangement and are therefore available as starting values for each subsequent activation of the device without there being any need for renewed adaptation.

In said embodiment, the transmitting current control of the IR-LEDs may be separately set in a range of 16 dB in 16 stages of 1 dB for each of the beam transmitters SE in the form of IR-LEDs. The conversion factor control of the I/V converter 14 may be set in a range of 50 dB in 5 stages each of 10 dB. As a result of the measures described above, a continuous setting range of 65 dB may be run through in 1 dB stages for automatic adaptation of the device. Furthermore, as a result of overlapping of the setting ranges, component tolerances may also be compensated.

The overlap region is further utilized in conjunction with the separate setting facilities of the beam transmitters SE, in order to effect a sensitivity balance between the optical sections each comprising one IR-LED and one IR-photodiode, because only the total signal of the optical sections is converted by the I/V converter 14. Said balance is necessary to ensure that the sensitivity of all the optical sections is identical.

In particular, the following effects may be compensated as a result of transmitting current control of the beam transmitters SE and conversion factor control of the I/V converter 14:

1) different types of screen (heat insulating glass, clear glass)
2) manufacturing tolerances of the transmitting and receiving diodes
3) tolerances in the trigger and evaluation electronics
4) tolerances in the beam guide element 20
5) ageing effects of the transmitting and receiving diodes
6) aging effects of the screen 22 (e.g. scratches from being hit by stones).

While the best mode for carrying out the invention has been described in detail, those familiar with the art to which this invention relates will recognize various alternative designs and embodiments for practicing the invention as defined by the following claims.

What is claimed is:

1. A device for controlling a windscreen wiping system comprising a drive motor for driving at least one windscreen wiper arm for cleaning the outer surface of a windscreen, an optoelectronic apparatus disposed in the wiped area on the inner surface of the windscreen and including at least one beam transmitter and at least one beam receiver, and a circuit arrangement connected to the optoelectronic apparatus and the drive motor, with the beams which are emitted from the at least one beam transmitter in clocked form being modified between the beam transmitter and the beam receiver by a coating on the windscreen so that the signals received by the beam receiver are varied in dependence upon the coating present on the windscreen and said signals being converted by the circuit arrangement, which includes at least one I/V converter which amplifies the alternating component of the received signal, a phase-selective rectifier which acts as a narrow-band filter and rectifies the clocked component of the output signal of the I/V converter, and low-pass filters which receive the output from the phase-selective rectifier and filter out the interference quantities of the circuit components of the device, and convert the filtered output into control signals by means of which operation of the drive motor is determined,
wherein the circuit arrangement of the windscreen wiping system further comprises a control stage provided with a basic setting value, which is substantially determined by the optoelectronic apparatus when the windscreen is optimally clean and represents quasi-static conditions of the components of the device, provided for detecting the coating present on the windscreen, and the basic setting value is stored in a non-volatile memory of the circuit arrangement and is used as a starting value for all subsequent startups of the windscreen wiping system.

2. The device for controlling a windscreen wiping system as claimed in claim 1, wherein the control stage is associated with the at least one I/V converter for the purpose of setting a conversion factor of the I/V converter.

3. The device for controlling a windscreen wiping system as claimed in claim 1, wherein the control stage is associated with the at least one beam transmitter for the purpose of setting transmitting current of the at least one beam transmitter.

4. The device for controlling a windscreen wiping system as claimed in claim 1, wherein the control stage is associated both with the at least one I/V converter for the purpose of setting the conversion factor and with the at least one beam transmitter for the purpose of setting the transmitting current of the beam transmitter.

5. The device for controlling a windscreen wiping system as claimed in claim 1 or 2 or 3 or 4, wherein amplitude control is provided for setting the transmitting current of the at least one beam transmitter.

6. The device for controlling a windscreen wiping system as claimed in claim 4, wherein the transmitting current setting of the at least one beam transmitter is effected in the range of 1 to 16 dB in stages each of 1 dB and the setting of the conversion factor of the I/V converter is effected in the range of 0 to 50 dB in stages each of 10 dB.

7. The device for controlling a windscreen wiping system as claimed in claim 6, wherein the optoelectronic apparatus comprises a plurality of beam transmitters and beam receivers, each beam transmitter including a transmitting current setting.

8. The device for controlling a windscreen wiping system as claimed in claim 7, wherein each beam transmitter is an IR-LED.

9. The device for controlling a windscreen wiping system as claimed in claim 8, wherein each beam receiver is an IR-photodiode.

* * * * *